US011017085B2

(12) United States Patent
Kraft (10) Patent No.: US 11,017,085 B2
(45) Date of Patent: May 25, 2021

(54) METHODS AND NODES FOR ANOMALY DETECTION IN COMPUTER APPLICATIONS (71) Applicant: Percepio AB, Västerås (SE)

(72) Inventor: Johan Kraft, Västerås (SE)

(73) Assignee: PERCEPIO AB, Västerås (SE)

(*) Notice: Subject to any disclaimer, the term of this patent is extended or adjusted under 35 U.S.C. 154(b) by 0 days.

(21) Appl. No.: 16/028,583

(22) Filed: Jul. 6, 2018

(65) Prior Publication Data
US 2020/0012791 A1    Jan. 9, 2020

(51) Int. Cl.
*G06F 12/14* (2006.01)
*G06F 21/56* (2013.01)
*G06F 8/65* (2018.01)
*H04L 12/24* (2006.01)

(52) U.S. Cl.
CPC .............. *G06F 21/563* (2013.01); *G06F 8/65* (2013.01); *H04L 41/069* (2013.01); *G06F 2221/033* (2013.01)

(58) Field of Classification Search
USPC .................. 726/23, 22, 24–25; 713/187–189
See application file for complete search history.

(56) References Cited

U.S. PATENT DOCUMENTS

| | | | | |
|---|---|---|---|---|
| 6,405,318 B1* | 6/2002 | Rowland | ............... | G06F 21/552 726/22 |
| 7,352,280 B1* | 4/2008 | Rockwood | ............. | G06F 21/55 340/521 |
| 7,603,709 B2* | 10/2009 | Lewis | ................. | H04L 63/0227 726/23 |
| 9,282,114 B1* | 3/2016 | Dotan | ................... | G06F 21/552 |
| 9,654,485 B1* | 5/2017 | Neumann | ........... | H04L 63/1416 |
| 9,807,106 B2* | 10/2017 | Daniel | ............... | H04L 63/1416 |
| 9,979,742 B2* | 5/2018 | Mumcuoglu | ......... | G06F 21/552 |
| 10,405,041 B2* | 9/2019 | Miller | .................. | H04N 21/475 |

(Continued)

OTHER PUBLICATIONS

R. Sekar, M. Bendre, D. Dhurjati, and P. Bollineni. 2001. A Fast Automaton-Based Method for Detecting Anomalous Program Behaviors. In Proceedings of the 2001 IEEE Symposium on Security and Privacy (SP '01 ). IEEE Computer Society, Washington, DC, USA, May 14, 2001.

(Continued)

*Primary Examiner* — Amare F Tabor
(74) *Attorney, Agent, or Firm* — Gabriela B. Tomescu, Esq.; Bergenstråhle & Partners AB (57) ABSTRACT

Disclosed is a method, for detecting anomalies in a computer application which is running on a device in a data communications system, thereby creating events in the computer application. Each event comprises an event code identifying the event. The method comprises obtaining (200) an event profile of the computer application, the event profile comprising each unique event code of events detected during a defined period of operation of the computer application. The method further comprises detecting (220) a first event from the computer application, and comparing (222) the event code of the first event with the event codes of the event profile. The method further comprises, if the first event does not match any event in the stored event profile, creating (224) a notification.

10 Claims, 5 Drawing Sheets

(56) References Cited

U.S. PATENT DOCUMENTS

| | | | |
|---|---|---|---|
| 2015/0215329 A1* | 7/2015 | Singla | H04L 63/1416 726/23 |
| 2017/0046660 A1* | 2/2017 | Jaiswal | G06Q 10/1093 |
| 2017/0206354 A1 | 7/2017 | Pieczul | |
| 2017/0279840 A1* | 9/2017 | Zhang | H04L 63/1425 |
| 2017/0353477 A1* | 12/2017 | Faigon | H04L 63/1416 |
| 2018/0167406 A1* | 6/2018 | Zhong | G06F 11/30 |
| 2018/0212985 A1* | 7/2018 | Zadeh | H04L 63/1425 |
| 2019/0036978 A1* | 1/2019 | Shulman-Peleg | G06F 21/554 |

OTHER PUBLICATIONS

Forrest S; Hofmeyr S A; Somayaji A; Longstaff TA, "A sense of self for Unix processes", Security and Privacy, 1996. Proceedings., 1996 IEEE Symposium on Oakland, CA, USA May 6-8, 1996, Los Alamitos, CA, USA, IEEE Comput. Soc, May 6, 1996, doi: 10.1109/SECPRI.1996.502675, ISBN 978-0-8186-7 417-4 ; ISBN 0-8186-7 417-2.

Zhen Liu; Bridges SM, "Detecting anomalies in cluster-based parallel programs using a wavelet based approach", Networking, Sensing and Control, 2005. Proceedings. 2005 IEEE Tucson, AZ, USA, Mar. 19, 2005, doi:10.1109/ICNSC.2005.1461214 , ISBN 978-0-7803-8812-3, ISBN 0-7803-8812-7.

\* cited by examiner

METHODS AND NODES FOR ANOMALY DETECTION IN COMPUTER APPLICATIONS

TECHNICAL FIELD

The present disclosure relates generally to methods and systems for detecting anomalies in computer behavior at runtime, for example in embedded computer systems.

BACKGROUND

Whenever a new computer application is released, and also when a computer application is updated, there is a risk that some defects remain in the software code, which might cause it to behave suboptimally or in ways that were not intended. Such behaviors may represent critical errors in the software or vulnerabilities that allow attackers to gain access to the system for malicious purposes.

Current solutions for finding and correcting such errors are often time-consuming and ineffective, requiring a lot of guesswork by the developers as error reports are not always provided from end users and otherwise lack sufficient details, making it difficult to reproduce the problem for analysis. The user might not even be aware of the problem, e.g., in case of a malicious intrusion.

Consequently, there is a need for better solutions for detecting errors and abnormal behavior in computer applications during deployed operation.

SUMMARY

It is an object of embodiments of the invention to address at least some of the problems and issues outlined above. It is an object of embodiments of the invention to provide a method for anomaly detection in computer applications. The solution provided herein may be a faster, more efficient and more effective solution than currently available solutions. It is possible to achieve these objects, and others, by using a method and a control node as defined in the attached independent claims.

According to one aspect, a method for detecting anomalies in a computer application is provided. The computer application is running on a device in a data communications system, thereby creating events in the computer application, wherein each event comprises an event code identifying the event. The method comprises obtaining an event profile of the computer application, the event profile comprising each unique event code of events detected during a defined period of operation of the computer application. The method further comprises detecting a first event from the computer application, and comparing the event code of the first event with the event codes of the event profile. If, or when, the first event does not match any event stored in the event profile, the method further comprises creating a notification.

According to one embodiment, each event comprises order information comprising information regarding at least one preceding or following event. The comparing step may further be based on the order information as well. By considering order information, it becomes possible to perform a more complex analysis of what constitutes an anomaly, which also may be more accurate.

According to an embodiment, obtaining an event profile comprises detecting a set of events from the computer application over a defined time period and then creating and storing an event profile of the computer application, comprising each unique event code of the detected set of events.

According to an embodiment, creating and storing an event profile comprises, for each event in the set of events, comparing the event code of the event with the event codes of events already stored in the event profile, and, if the event code of the event does not match any event code in the event profile, storing the event code of the event in the event profile.

According to an embodiment, obtaining an event profile further comprises obtaining information regarding which events that are considered delimiter events, wherein a delimiter event is an event indicating an end of an event pattern. It further comprises dividing the detected first set of events into event patterns, based on which events are indicated as delimiter events, and obtaining order information for each event, wherein the order information comprises information regarding at least one preceding or following event. By using delimiter events, the size of the event profile may be reduced, since event patterns only need to be represented once per pattern in the event profile.

According to an embodiment, the method further comprises updating the computer application based on the notification. The updating may comprise checking if there is an updated version of the computer application available, and if there is, downloading it and installing it.

According to an embodiment, the events further comprise timestamp information. The comparing step may further be based on the timestamp information, such that events may be considered anomalies even if they are the events that are expected, in case their corresponding timing information differs too much.

According to another aspect, a control node operable in a data communications system is provided. The data communications system comprises a device on which a computer application may be run, or is running, wherein events are created in the computer application when run, wherein each event comprises an event code identifying the event. The control node comprises processing circuitry and a memory, wherein the memory contains instructions executable by the processing circuitry. The control node is operative for obtaining an event profile of the computer application, the event profile comprising each unique event code of events detected during a defined period of operation of the computer application. The control node is further operative for detecting a first event from the computer application and comparing the event code of the first event with the event codes of the event profile. The control node is further operative for creating a notification if the first event does not match any event stored in the event profile.

According to other aspects, computer programs and carriers are also provided, the details of which will be described in the claims and the detailed description.

Further possible features and benefits of this solution will become apparent from the detailed description below.

BRIEF DESCRIPTION OF DRAWINGS

The solution will now be described in more detail by means of example embodiments and with reference to the accompanying drawings, in which.

DETAILED DESCRIPTION

In the following description, it is understood that all recited connections between structures can be direct operative connections or indirect operative connections through intermediary structures. A set of elements includes one or more elements. Any recitation of an element is understood to refer to at least one element. A plurality of elements includes at least two elements. Unless otherwise required, any described method steps need not be necessarily performed in a particular illustrated order. A first element (e.g. data) derived from a second element encompasses a first element equal to the second element, as well as a first element generated by processing the second element and optionally other data. Making a determination or decision according to a parameter encompasses making the determination or decision according to the parameter and optionally according to other data. Unless otherwise specified, an indicator of some quantity/data may be the quantity/data itself, or an indicator different from the quantity/data itself. Computer programs described in some embodiments of the present invention may be stand-alone software entities or sub-entities (e.g., subroutines, code objects) of other computer programs. Computer readable media encompass non-transitory media such as magnetic, optic, and semiconductor storage media (e.g. hard drives, optical disks, flash memory, DRAM), as well as communications links such as conductive cables and fiber optic links. According to some embodiments, the present invention provides, inter alia, computer systems comprising hardware (e.g. one or more processors and associated memory) programmed to perform the methods described herein, as well as computer-readable media encoding instructions to perform the methods described herein.

The following description illustrates embodiments of the invention by way of example and not necessarily by way of limitation.

In the following, a detailed description of different embodiments of the solution is disclosed with reference to the accompanying drawings. All examples herein should be seen as part of the general description and are therefore possible to combine in any way in general terms. individual features of the various embodiments and methods may be combined and exchanged unless such combination or exchange is clearly contradictory to the overall function of the implementation.

Briefly described, methods, systems and control nodes for detecting runtime anomalies in computer applications are provided, which are resource efficient and provides a way for system developers to quickly detect problems and which improves the ability for the developers to subsequently correct the problems as well. A typical system used for anomaly detection according to the present disclosure comprises a control node for performing the anomaly detection and a device on which a computer application is executed, which may be the same device as the control node. The anomaly detection according to the present disclosure is typically used in special-purpose systems comprising both software and hardware, such as embedded computer systems. In some embodiments, the anomaly detection is used in an embedded software system. In some embodiments the method may be performed on software applications that may execute on unspecified general-purpose hardware, or on pure hardware applications, although in most cases a software would be needed to communicate the results in a preferable way. A method for anomaly detection is provided which comprises obtaining an event profile for the computer application, wherein the event profile comprises information representing the events, such as a list or log of the unique event codes of events detected during normal operation of the system, wherein the term "event" is intended to denote a specific action performed by a computer application, such as a call to a particular API function or other events like context-switches and interrupts. The method comprises detecting a new event from the computer application, and comparing that event with the event profile. If the detected new event does not match any event in the stored profile, a notification is created such that a user and/or system developer is alerted regarding the detected anomaly.

By having such methods for anomaly detection, it becomes possible for system developers to quickly become aware of abnormal behaviors in computer applications, which also enables such behaviors to be corrected for, in case it turns out to be an unwanted behavior. Further, if the target system running the computer application is connected to the internet, it may be possible to submit a notification to the developers this way, and also to update the software over the internet once the problem has been fixed, ideally within a short time of detecting the anomalous behavior. Internet connectivity may also allow for updating the event profile, in order to improve its accuracy.

The behavior of a computer application, such as a software application, can be recorded as a trace, wherein a trace is a list of events performed by the specific computer application in chronological order. Such traces can be recorded during development of a computer application, e.g. as part of testing or debugging, or may be recorded from deployed systems in customer use. A trace of a computer application can be produced e.g. by using hardware trace features in the processor, or it may be produced by using software, e.g. by adding tracing code to a target system. The resulting traces of events comprise information regarding the character of an event, such as an event code, and it may also contain timestamp information, and in some cases there may be additional data specific for the type of event, such as diagnostic messages, software states and pointers to software objects.

The trace of a computer application may be regarded as a unique characteristic for a specific software at runtime. Although a trace is not necessarily strictly repetitive, it is likely to contain many patterns in the observed events, both periodically repeating patterns and patterns triggered by system input events. By recording a relatively large set of trace data from normal operation of a system where no errors were observed, a reference for correct behavior may be achieved. This is referred to as an event profile in the present disclosure, wherein an event profile describes the software events recorded during runtime of a certain application and may also describe the expected order of events (event patterns).

Based on an event profile of a computer application, if a new trace is recorded and is found to contain events, or event patterns, not already present in the event profile, those events will be regarded as anomalies, wherein an anomaly represents a software behavior that does not exist in the event profile. Since the event profile is intended to be based on a relatively large amount of data representing intended behavior, an anomaly is likely to indicate an undesired behavior, such as an error or an external attack on the system that changed the order or timing of events. However, it is also possible that an anomaly would indicate an intended behavior that was not recorded when creating the event profile, which is denoted a false anomaly. False anomalies may reveal missing test cases and may be used to improve the system testing, especially in embodiments wherein the event profile reflects all test cases normally performed by the target system developer.

In some embodiments, information regarding the order of events is also taken into consideration when determining whether a newly detected event is to be considered as an anomaly or not. For example, a newly detected event may be considered as an anomaly if it is not preceded by the same event as expected by the event profile.

The event profile may in some embodiments comprise multiple subprofiles, wherein a subprofile describes the behavior of a limited part of a computer application, such as a specific thread, process, subsystem or a group of specific threads, processes or subsystems. In terms of detecting and recording the behavior of a computer application, this may in some embodiments be performed for one subprofile at a time, and then all of the subprofiles are added together to form the event profile, wherein the event profile may include all of the expected behavior of the computer application. As an illustrative example, in a mobile phone, one subprofile may describe the behavior regarding charging and another subprofile may describe the behavior regarding how to connect to a base station. The event profile would then describe all aspects described by the subprofiles of the mobile phone.

In embodiments that take event order into account, the use of subprofiles may allow for a significant reduction the total size of the event profile and may also increase the accuracy of the anomaly detection. This is due to that a trace may contain events from multiple unrelated system functions, and such unrelated events may be randomly interleaved in the trace due to minor variations in system timing. This makes the number of possible event patterns grow exponentially with the number of interleaving events and often become very large. Using multiple subprofiles instead of a single large event profile may result in a smaller total profile size since the subprofiles can be defined to group related events, unlikely to occur in random order. This way, only a small fraction of the all possible event patterns in the system trace needs to be explicitly represented, compared to if using a single events profile for all events. Moreover, by using subprofiles, an unexpected event pattern is more likely to be a significant anomaly, since the order of unrelated events can be ignored.

Figure 1:
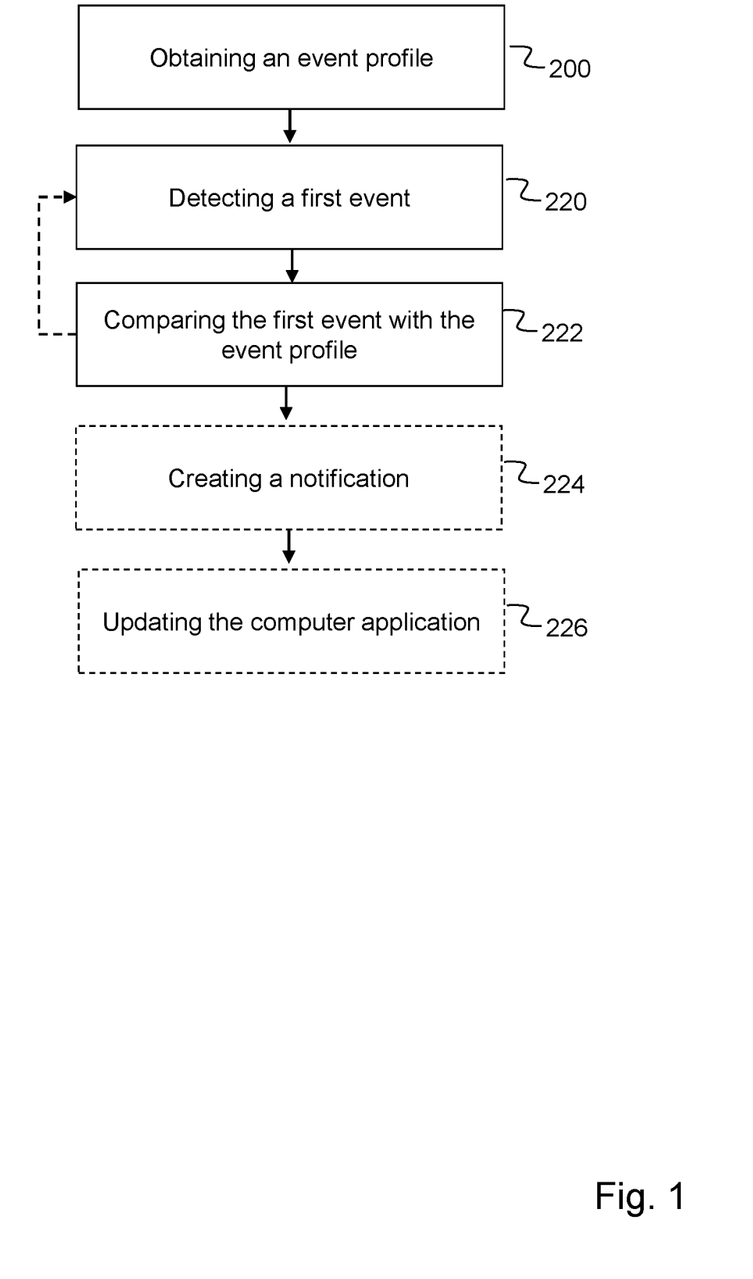
FIG. 1 schematically shows method steps of a first embodiment of a method performed by a control node of a data communications system according to the present disclosure.

FIG. 1 shows an embodiment of a method for detecting anomalies in a computer application running in a data communications system. The method may be performed by a control node of the data communications system, wherein the control node may be a device comprising processing circuitry and a memory, such as a computer. The computer application may be a software application or a hardware application, such as a programmable hardware (e.g. a Field-Programmable Gate Array, FPGA), or a combination of software and hardware. In some embodiments, the control node and the computer application may be run on the same device, and in some embodiments, the control node and the computer application are run on different devices. The computer application may further be designed to control a computer controlled device, which may be the same device on which the computer application is run, but which also may be a device different than the device on which the computer application is run. For example, the computer application may be an embedded software application running on a microcontroller that controls a device, and the control node may be a computer connected to the microcontroller. The control node may in some embodiments also be comprised in the microcontroller. In some embodiments, the method is performed by a system of the data communications network. The system may be a single device or it may be a group of devices, wherein functionality for performing the method are spread out over different physical, or virtual, devices of the network. In other words, the system may in its turn be a cloud solution, i.e. the system may be deployed as cloud computing resources that may be distributed in the network.

The method comprises a first step 200 of obtaining an event profile comprising a list or log of unique events detected during normal operation or testing of the system, wherein each event comprises an event code identifying the event. The event profile comprises representations of the detected events, wherein the representations of the events are typically the corresponding event code of the event. Typically, each event which may occur in the computer application is pre-defined in the computer application, and each event has a unique event code assigned to it. In some embodiments, the pre-defined events include events which are not desired, which may facilitate identifying unintended and/or unwanted behavior. In some embodiments, all possible events are not known beforehand, although in such cases the range of possible events is known. The range may e.g. be an integer from 0 to a specific number or a string of text with a predefined maximum number of characters, or similar. The event codes of events may be assigned by the application developer or may be pre-defined in the operating system or hardware on which the application is executed.

As an illustrative example, a first event in a computer application running on a microprocessor which controls the temperature of a fridge may be to increase the temperature, and a second event may be to decrease the temperature. The first event of increasing the temperature would have a corresponding first event code, and the second event of decreasing the temperature would have a corresponding second event code, wherein the first and second event codes are different from each other. As will be understood, depending on the system on which the computer application is run, an event code may indicate virtually any type of event that occurs in the system.

After an event profile has been obtained, the method comprises a step 220 of detecting a new event from the computer application, and then a step 222 of comparing the detected first event with the stored event profile. Comparing 222 the detected first event with the event profile comprises comparing at least the event code of the first event with all event codes in the event profile. In most cases, the detected new first event will most likely be an event having an event code which is already present in the event profile. If the detected event has an event code which is already present in the event profile, the method may comprise looping back to the detecting step 220 again, i.e. detecting another event, which may then be seen as a second event. If the second event is not regarded as an anomaly either, a third event may be detected, and so on. The method may then continue to run like this until an anomaly is detected.

When and if an event is detected which is not represented in the event profile, i.e. an event which does not match any event stored in the event profile, the method comprises a step 224 of creating a notification, indicating that an anomalous event has occurred. The first event not matching any event stored in the event profile may entail that the event code of the first event does not match any event codes stored in the event profile. In some embodiments, the notification is sent on a user interface, such that a user of the system can respond to it, and/or it may be stored in a diagnostic log, which subsequently can be submitted to customer support. In some embodiments, the notification may be sent over the Internet. If the event profile also describes the expected order of events, a sequence of events may also be regarded as an anomaly even if the individual event codes are included in the event profile, if they appear in the wrong order as compared with the event profile. In some embodiments, the method may further comprise looping back to the detecting step 220 after an anomaly has been detected and a notification has been created. By having the notification step 224, a user of the computer application may be alerted to the anomalous behavior, and make a decision regarding what to do about it, or the application can send the notification automatically to the system developer for analysis.

Due to the complex nature of systems in which methods according to the present disclosure may be implemented, it may be difficult to automatically determine what to do regarding a detected anomaly. To decide whether an anomaly represents a real defect in the software or a false anomaly, caused by an incomplete event profile, is likely to require manual analysis by the system developer based on the notification, other diagnostic information and the application source code. However, in some embodiments the method may further comprise a step of providing a suggestion related to the detected anomaly. For example, the suggestion may be to check for updates of the application, restart the application or reset the application to its original state (e.g. a "factory reset" of a device). In some embodiments, the method may further comprise updating the event profile to include the detected event which was flagged as a possible anomaly as part of the expect normal behavior, after it has been determined that the detected anomaly was a part of the intended behavior.

Figure 3A:
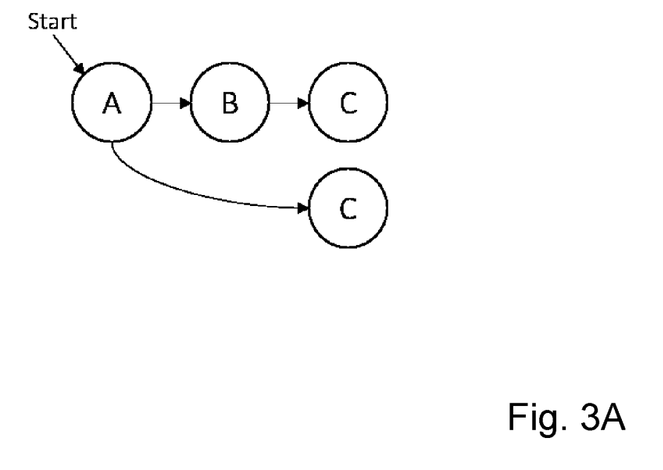
FIG. 3A shows a first embodiment of a graphic representation of an event profile.
Figure 3B:
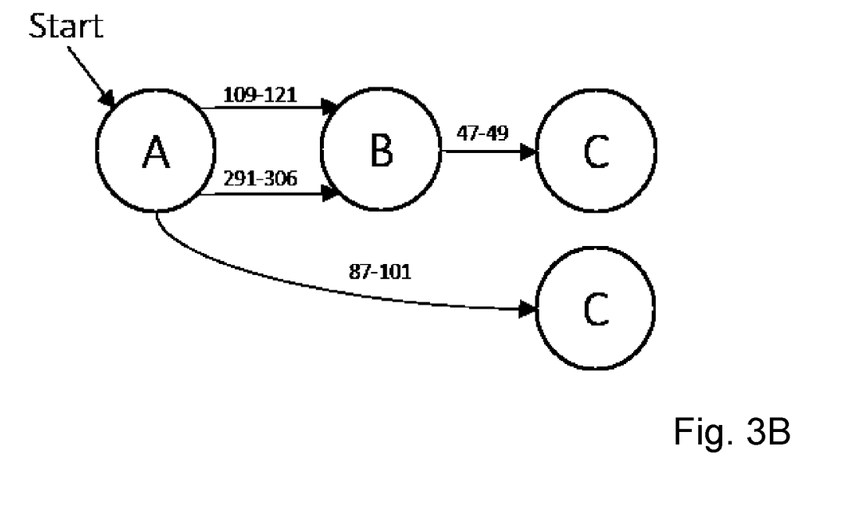
FIG. 3B shows a second embodiment of a graphic representation of an event profile.

In some embodiments, the detected events may further comprise order information, detailing which event or range of events that precede or follow a certain event. In some embodiments, the method comprises a step of obtaining order information of the events. In some embodiments, the immediately preceding event is contained in the order information for each event. In some embodiments, the immediately following event is contained in the order information for each event. By including, for each event, information regarding at least the immediately preceding event or immediately following event, the events and their order information may be represented as a graph structure, which is shown in FIGS. 3A and 3B. The complete graph structure representing an event and all preceding events may be achieved as long as order information regarding the immediately preceding event is contained in the order information. In some embodiments, the order information contains information regarding multiple events preceding and/or following an event.

The concept of using subprofiles may also be relevant from the perspective of order information. If an event belonging to one subprofile happens after an event belonging to another subprofile, it may be assumed that the events should not be considered as related to each other, since they belong to different subprofiles. This would then entail that the order information would not consider two such events to follow one another.

Further, in embodiments wherein the detected events comprise order information, the comparing step 222 may further be based on the order information, such that an event may be considered an anomaly even if the event code matches an expected event code, if the event is not expected to follow the previously detected event. This may be checked by either looking at order information of the current event, if the order information contains information regarding the preceding event, or it may be checked by looking at order information of the previously detected event, if the order information contains information regarding the following event. As long as the previously observed event is remembered, including its corresponding entry in the event profile, and each event in the event profile comprises information regarding at least the events expected to immediately precede or follow the event, it becomes possible to obtain complete order information for any sequence of events, as long as at least one event in the sequence and its corresponding order information is known. This way, it is possible to compare patterns in the detected events with patterns expected by the event profile, where the compared pattern length is limited only by the event profile size. In some embodiments, one preceding event or one following event is considered in the comparing step 222. In some embodiments, multiple preceding or following events are considered in the comparing step.

After a notification has been created regarding an anomalous event that has been detected, it is possible to analyze the nature of the anomalous event, in order to determine if it constitutes a true anomaly (caused by an undesired behavior) or a false anomaly (caused by an incomplete event profile). This analysis may in some embodiments be facilitated by providing the sequence of detected events as part of the notification. In that case, if the anomaly was deemed a false anomaly, the sequence of events provided with the notification can be used to improve the event profile and the test suite used for generating the event profile.

In some embodiments, the method may further comprise a step of updating 226 the computer application, based on the notification of an anomaly. In some embodiments this entails updating the event profile to include a detected anomalous event. In some embodiments, this entails updating the computer application, or the source code of the computer application, such that the detected anomalous event no longer can occur.

Figure 2:
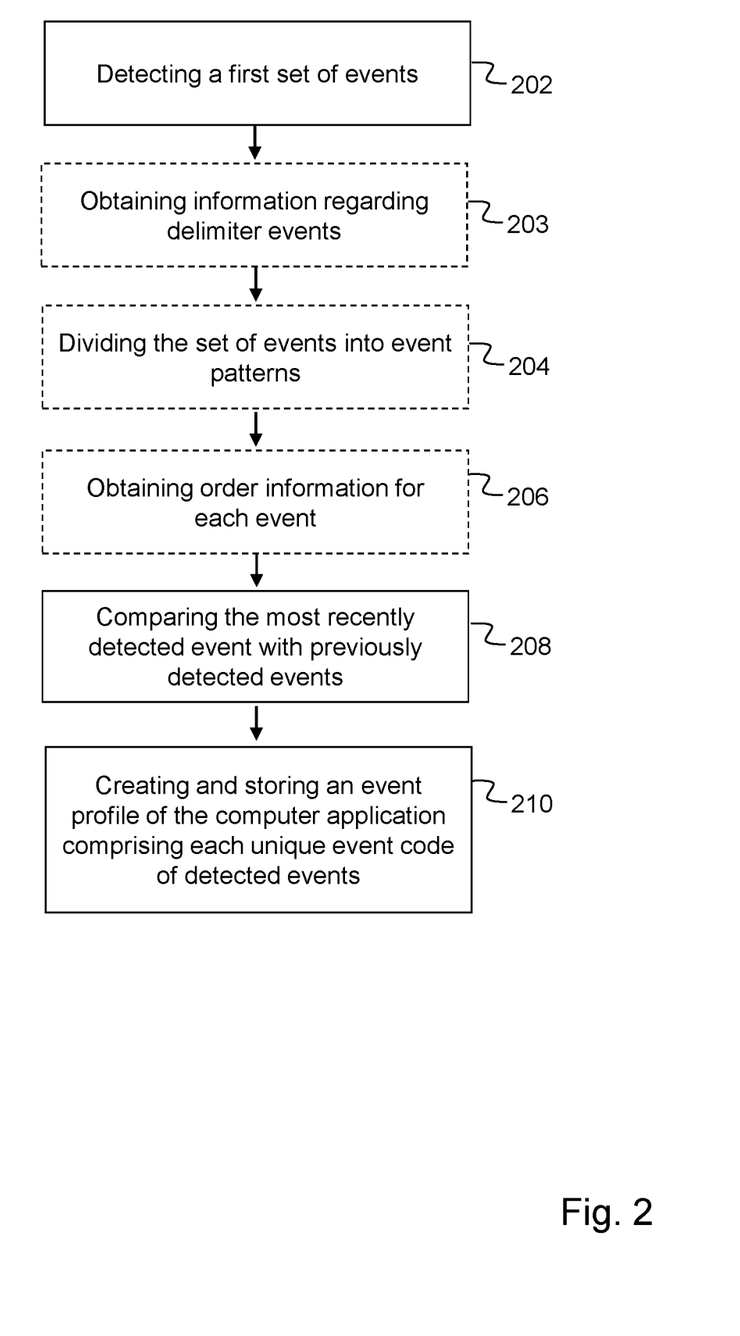
FIG. 2 shows embodiments of possible substeps in the obtaining step of FIG. 1.

The step 200 of obtaining an event profile may comprise substeps, such as creating the event profile, which are shown in FIG. 2 and which will now be elaborated on. In order to create an event profile for a computer application, the behavior of the computer application is monitored and/or recorded during operation of the application. The operation of the application may be in test environments intended to test the application before release, but may also be during normal operation after the application has been deployed. In some embodiments, the event profile may be created by one device and the anomaly detection may be performed by another device. In some embodiments, the event profile is created on the same device as the anomaly detection is performed by.

In some embodiments, obtaining 200 comprises a step 202 of detecting and/or recording a first set of events. The first set of events are detected and/or recorded during a defined period of time, which may e.g. be a predefined test period where the program behavior is verified using existing test procedures. The purpose of the step 202 is to create a list or log of all events that occurred during the defined time period. It may be possible that events that are detected during the detecting step 202 are undesired events, such as failed memory allocations. By having undesired events present in the event profile, with information that they are undesired, it may become easier and faster to detect those events if they were to occur again. However, in some embodiments, the event profile only comprises events which were determined to be correct, such that any newly detected event which is not present in the event profile implies an anomaly.

After the detecting step 202 has been performed for a sufficient amount of time, a number of different events will have been detected. In some embodiments, the step 202 is performed until all pre-defined test cases have been executed and recorded. In some embodiments, the step 202 is performed until the recorded system has executed for a pre-defined time. In some embodiments, the step 202 is performed until no new event has been detected for a predefined amount of time. In some embodiments, the step 202 is performed until no new event has been detected for a predefined number of loops of the detecting step 202.

After the detecting step 202 has been performed, a first set of events have been detected. The method then comprises, for each detected event in the detected first set of events, the step of comparing 208 the most recently detected event with all of the previously detected events during the detecting step 202. If the comparison indicates that the most recently detected event had already been detected at least once, the profile does not need to be updated. In some embodiments, this entails taking order information into account, such that the profile may be updated with a newly detected event that is already present in the profile, if the newly detected event is preceded or followed by other events than the entry already present in the event profile. However, in case the most recently detected event constitutes an event which has not yet been detected, in some embodiments also taking event order into account, the method comprises a step of storing the event in the event profile. By performing these steps as described above, an event profile is achieved which comprises all the unique events, including at least the unique event code of each detected event, and in some embodiments also comprising order information regarding the expected order of events. The advantage of creating an event profile comprising only the unique event codes of detected events, is that the size of the event profile relatively small since each event only needs to be represented once, which reduces the amount of storage space needed compared to a solution in which each individual event is stored even if previously detected.

The method may then in some embodiments comprises a next step 210 of creating and storing an event profile of the computer application, comprising all unique event codes of the detected first set of events, and in some embodiments also other characteristics of the events, such as order and timing information, which were detected during the detecting step 202. The event profile is typically stored in a memory of the control node, but it may also be stored elsewhere in the data communications system, as long as it can be accessed by the control node. In some embodiments, static parts of the event profile are stored in read-only memory of a microcontroller on which the computer application is run, to reduce the usage of random-access memory.

The event profile comprises at least all unique event codes of the detected events that occurred during the detecting step 202, and optionally also other characteristics of the events.

In some embodiments, the event codes of all events that occurred during the detecting step 202 are present in the event profile, but the same event code is not represented more than once. In some embodiments, the event profile may also comprise the order in which events have been detected and optionally also the time between events which will be elaborated on further later in this application. In embodiments wherein the event profile also comprises information regarding order of events, it is possible that the same event code is present multiple times, with differences in following and/or preceding events, and/or in regards to timing information.

In some embodiments, the step 200 of obtaining an event profile may comprise additional steps after the step of detecting 202 a first set of events and before the comparing step 208. The method may in some embodiments comprise a step of obtaining 203 information regarding which events are considered delimiter events. Typically, the event code of an event is used to determine whether the event is a delimiter event or not. The information regarding which events are considered delimiter events is obtained by the entity performing the method, such as the control node, and may be obtained from e.g. the system developer of the computer application. In some embodiments, information regarding which events are considered to be delimiter events is obtained together with the computer application itself, which entails that it may already be available in the entity performing the method at the start of the method.

The method may then comprise a step 204 of dividing the set of events into event patterns, based on the information regarding which events are considered as delimiter events obtained in step 203. A delimiter event is an event that marks the end of an event pattern, and may be seen as the last event in a sequence of related events representing a specific behavior of the computer application. As will be understood, in case all events are regarded as delimiter events, each event would be its own event pattern. Further, in case no events are regarded as delimiter events, all detected events in sequence would be regarded as a single event pattern. By introducing delimiter events, repeating patterns of events may be recognized which enables a more efficient representation of an event profile.

As an example, if the letters A, B and C represent events, consider the following sequence of events: A, B, C, A, C, A, B, C, A, B, C, A, C. If C is considered to be a delimiter event, the sequence could be split into the following event patterns:
A, B, C
A, C
A, B, C
A, B, C
A, C As can be seen, in case C is a delimiter event, the sequence of events contains two distinct event patterns, namely (A, B, C) and (A, C). This can also be represented graphically, which is shown in FIG. 3a.

Thus, if an event profile was to be created based on the sequence of events shown above, it would contain the two distinct patterns (A, B, C) and (A, C), which means that the computer application for which the event profile was created is expected to always start a sequence of events with an event A. After event A, either event B or C will follow. If B follows A, C will follow B, after which the event pattern is completed. If C follows A, the event pattern is completed after event C. As will be understood, the above is merely an illustrative example, when deploying methods for anomaly detections as described herein the range of possible events and different event patterns will normally be much greater.

By dividing the events into event patterns, a more efficient representation of the event patterns in the event profile may be achieved. In the above example, only two sequences of events need to be stored, and the event profile may then be based on these event patterns instead of repeating the individual events every time, which reduces the amount of storage space needed for the event profile and makes for a more efficient method.

In some embodiments, each delimiter event is followed by a state in which no event has been detected, which may be seen as a kind of null state, which may be the same state as before a first event is detected during the detecting step 202. In some embodiments, each delimiter event is regarded as being followed by the first event in the sequence of events that follows the delimiter event. In some embodiments, each delimiter event is regarded as an event with no following events and the state is reset to the null state after the delimiter event, which may be seen as the sequence of events restarting.

After a detected set of events has been divided into event patterns, it becomes possible to see how events relate to each other, as seen in FIG. 3a, which is a graphical representation of the two identified patterns in the example above. Looking at the example of FIG. 3a, it can be seen that event A may be followed by either event C or event B, whereas event B is always followed by event C. Such information regarding how events relate to each other may also be included into the event profile, i.e. information regarding which event, or which range of events, is supposed to follow or precede a certain event. This may be done in a step 206 of obtaining order information for each event, wherein the order information is information regarding which event or events that follow and/or precede a certain event. In some embodiments, the event profile comprises information regarding which event, or which range of events, is supposed to follow a certain event. In some embodiments, the event profile may comprise information regarding which event, or which range of events, is supposed to precede a certain event. In some embodiments, information regarding both which event, or range of events, is supposed to follow and which event, or range of events, is supposed to precede an event. By including such information, a more detailed analysis regarding what is regarded as an anomaly may be achieved. Further, by including such information, it also becomes possible to represent an event profile as a graph structure, as seen in FIGS. 3A and 3B. In some embodiments, the event profile is represented as a graph structure.

Again using the example of FIG. 3a, event B would not be considered an anomaly if it was preceded by event A, but it would be considered an anomaly if it was preceded by event C. This type of anomaly detection is not possible without including information regarding the expected order of events. Detecting that event B should be preceded by event A could be done by either analyzing the order information of event A, in case the order information comprises information regarding the following event, or it could be done by analyzing the order information of event B, if the order information contains information regarding the preceding event. In embodiments comprising the dividing step 204, and the step 206 of obtaining order information for each event, the information regarding which events precede an event may also be used as a basis for comparison in the comparison step 208, such that a same event code may be seen as an anomaly if it is preceded by one event, but not seen as an anomaly if it is preceded by another event.

In some embodiments, in order to reduce the size of an event profile, the links between events within the event profile does not need to be regular pointers such as 32-bit or 64-bit words, but may instead be expressed as index values using e.g. 8-bit or 16-bit values within the representation of the event profile. The number of bits needed depend on the number of events and the number of dependencies between the events within the event profile or subprofile.

Further, in some embodiments, the events detected during the detecting step 202 may comprise timestamp information which identifies a time when the event occurred. In embodiments wherein detected events comprise timestamp information, such information may also be used for determining which events are to be considered as anomalies. By using the timestamp information of events, the time elapsed between events may be determined, and used as a basis for determining whether an event is to be considered an anomaly. For example, a range may be used to specify the expected time between two following events, where the lower bound is based on the lowest detected time between two following events, and the upper bound is based on the highest detected time between two following events.

In some embodiments, multiple ranges of time intervals may be used in order to express the expected time between two events. For example, if the measured times between event A and event B is 109, 114, 115, 121, 291, 299 and 306, a single time interval from 109 to 306 does not reflect that there are no cases at all between in the range (121, 291). There are in fact two clusters of execution times, one [109, 121] and one [291, 306]. An execution time of 190 may be an anomaly, despite being very close to the mean value of the data points, since it is far outside both clusters. Thus, multiple intervals may be necessary in order to accurately describe the time between events, one per cluster.

Looking now at FIG. 3B, the same event pattern as in FIG. 3A is shown, the timing information described above is included into the graphical representation. There are two arrows, also referred to and known as edges, between event A and event B, one with the time interval [109, 121] and one with the time interval [291, 306]. Between event B and event C, there is only one arrow with a time interval of [47, 49]. Between event B and event C, in case C follows A, there is one arrow with a time interval of [97, 101].

By including this kind of information regarding the expected time in between events, it becomes possible to spot anomalies from a timing perspective. In combination with the other information regarding events, at least three kinds of anomalies may be detected:

1. Wrong event—this means that an event was detected that was not present in the event profile, or an event was detected which resulted in an event sequence that was not present in the event profile.
2. Wrong timing—this means that the time elapsed between two events was not within the expected ranges, as detected between two events of the same type during the detecting step 202.
3. Missing event—this means that the time elapsed since the last event is greater than expected. This is only applicable if no more event is observed, as it otherwise results in a type 1 or type 2 anomaly. This may be a time greater than the largest recorded time in between events during the detecting step 202, or it may be a predefined time period which is greater than the largest recorded time in between events in the detecting step 202. In order to separate missing events from delayed events, it is possible to use an extra condition so that events are only characterized as type 3 anomalies when the time since the previous detected event exceeds a specified timeout duration. This way, if the expected events arrives shortly after it was expected to, due to being briefly delayed for some reason but still within the specified timeout duration, it would result in a type 2 anomaly instead of a type 3 anomaly. As will be understood, depending on if a timeout duration is used and the relation between the timeout duration and the event timing, missing or extremely delayed events may be regarded as either a type 2 or type 3 anomaly.

Looking now at FIG. 4, an illustrative example of a data structure used for the event profile will now be described. Before the first event is detected during the detecting step 202, the system is in a starting state, or a null state, which is the same state it may return to in after detecting delimiter events as described previously. This state has no associated information about previously detected events.

Figure 4:
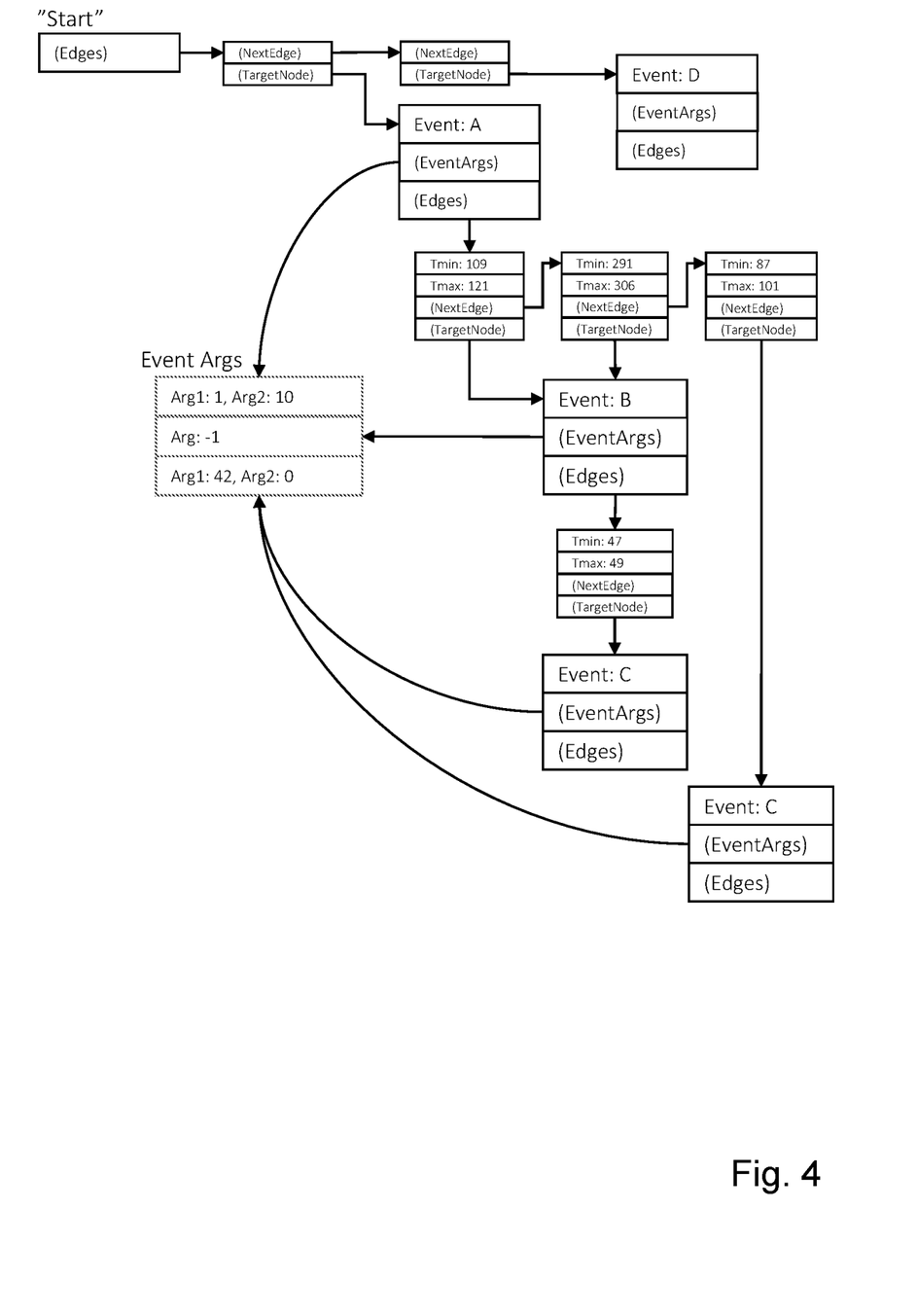
FIG. 4 shows an embodiment of a data structure of an event profile.

In the example provided in FIG. 4, all names within parentheses are references (pointers) to another node in the graph, as indicated by the edges (arrows). The dependencies between events, i.e. information regarding which event is to follow and the expected time between events, is represented by the four-field records in FIG. 4, whereas the events are represented by three-field records labelled Event A, Event B, Event C and Event D, where A, B, C and D correspond to the event codes. The links between the starting point, i.e. root or null state, and the expected first events can be represented by two-field records (a basic linked list). Timing information may be omitted in this case since there is no previous event to measure elapsed time against.

In some embodiments, including this example, the events may contain additional information apart from the event codes, denoted Event Arguments (EventArgs in FIG. 4). Event arguments may contain additional information regarding events, which are not represented by the event code. Following the example from before where the computer application controls the temperature of a fridge, event codes may be information detailing whether the temperature should be decreased or increased, whereas event arguments may be information detailing how much the temperature should be increased or decreased. In other words, event arguments may be seen as information modifying, but not changing, information contained in the corresponding event code. In other words, the event code may be seen as a classification of an event wherein the event arguments contain the details of the event.

As can be seen, the fields labelled "EventArgs" may refer to a separate list instead of storing this information within the event record itself, such that a reference to the event arguments is present rather than a full description of it. This kind of structure may be used in order to reduce the size of the event profile, in case several events have identical event arguments. Further, another reason for separating the storage of event codes and event arguments, is that an implementation using a fixed record size to represent an event is preferable for performance reasons, and the information contained in the event arguments may be variable in size.

Figure 5:
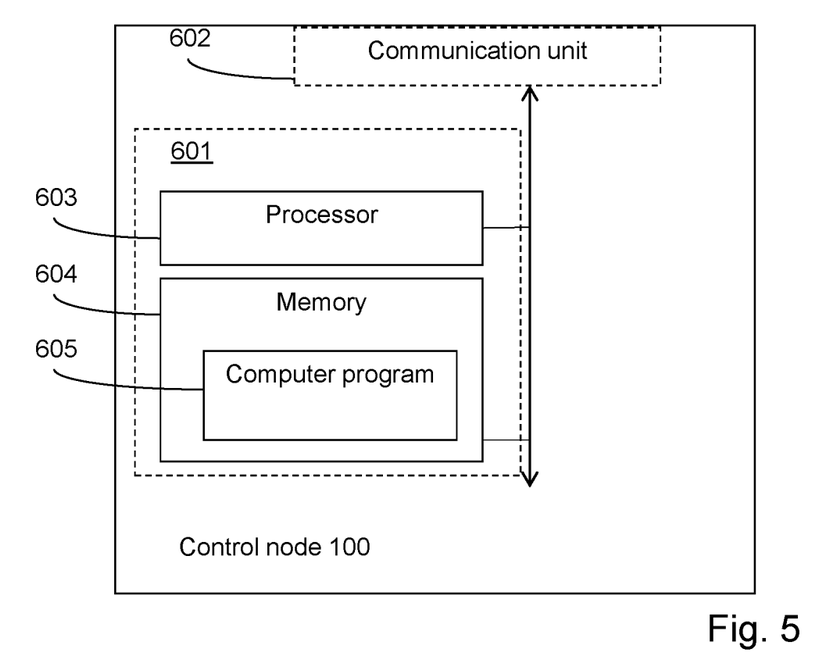
FIG. 5 shows a block schematic of a control node according to an embodiment.

FIG. 5 shows a control node 100 of a data communications system, for detecting anomalies in a computer application running on a device in the data communications system thereby creating events in the computer application, wherein each event comprises an event code identifying the event. The control node 100 comprises processing circuitry 603 and a memory 604. The processing circuitry 603 may comprise one or more programmable processor, application-specific integrated circuits, field programmable gate arrays or combinations of these (not shown) adapted to execute instructions. The memory contains instructions executable by said processing circuitry, whereby the control node 100 is operative for obtaining an event profile of the computer application, the event profile comprising each unique event code of events detected during a defined period of operation of the computer application. The control node 100 is further operative for detecting a first event from the computer application, and comparing the event code of the first event with the event codes of the event profile, and when the first event does not match any event in the stored event profile, the control node 100 is operative for creating a notification. The notification may be provided on a user interface or transferred to another computer.

According to an embodiment, each event comprises order information comprising information regarding at least one preceding event and/or at least one following event, and the comparing step is further based on the order information.

According to an embodiment, the control node 100 is further operative for detecting a set of events from the computer application over a defined time period, and creating and storing an event profile of the computer application, the event profile comprising each unique event code of the detected set of events.

According to an embodiment, the control node 100 is further operative for comparing the event code of the event with the event codes of events already stored in the event profile, and if the event code of the event does not match any event code in the event profile, storing the event code of the event in the event profile.

According to an embodiment, the control node 100 is further operative for obtaining information regarding which events are considered to be delimiter events, wherein a delimiter event indicates an end of an event pattern, and the control node 100 is operative for dividing the detected first set of events into event patterns, based on which events are indicated as delimiter events. The control node 100 is further operative for obtaining order information for each event, wherein the order information comprises information regarding an expected order of the events, wherein the comparing step is further based on the order information of events, such that events that are not expected to follow the previously detected event are considered an anomaly.

According to an embodiment, the control node 100 is further operative for updating the computer application based on the results from the comparing step.

According to other embodiments, the control node 100 may further comprise a communication unit 602, which may be considered to comprise conventional means for communicating with the data communications system. The instructions executable by said processing circuitry 603 may be arranged as a computer program 605 stored e.g. in the memory 604. The processing circuitry 603 and the memory 604 may be arranged in a sub-arrangement 601. The sub-arrangement 601 may be a micro-processor and adequate software and storage therefore, a Programmable Logic Device, PLD, or other electronic component(s)/processing circuit(s) configured to perform the methods mentioned above.

Figure 6:
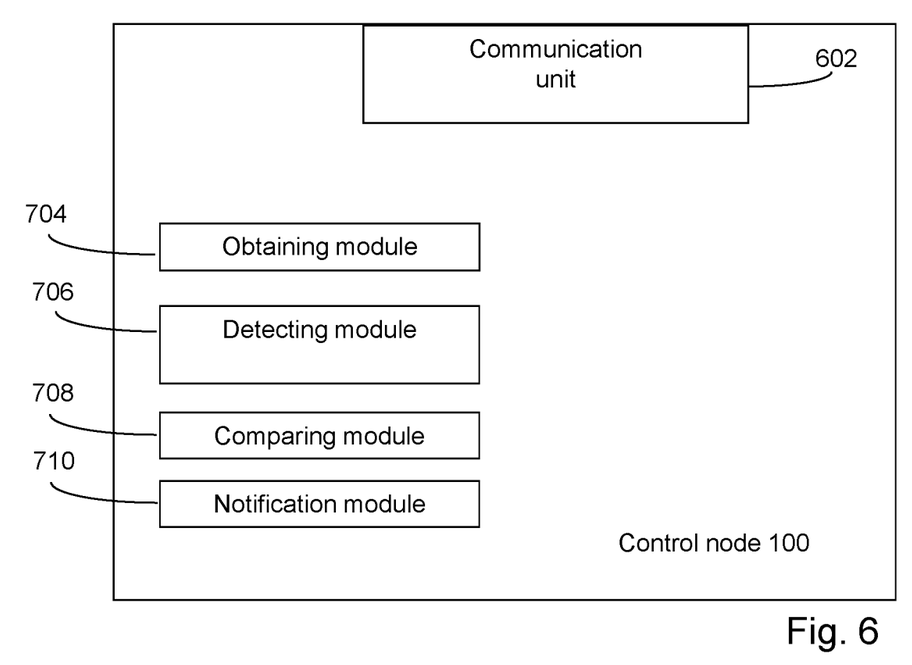
FIG. 6 shows a block schematic of a control node according to another embodiment.

The computer program 605 may comprise computer readable code means, which when run in a control node 100 causes the control node 100 to perform the steps described in any of the described embodiments of the control node 100. The computer program 605 may be carried by a computer program product connectable to the processing circuitry 603. The computer program product may be the memory 604. The memory 604 may be realized as for example a RAM (Random-access memory), ROM (Read-Only Memory) or an EEPROM (Electrical Erasable Programmable ROM). Further, the computer program may be carried by a separate computer-readable medium, such as a CD, DVD or flash memory, from which the program could be downloaded into the memory 604. Alternatively, the computer program may be stored on a server or any other entity connected to the data communications network to which the control node 100 has access via the communication unit 602. The computer program may then be downloaded from the server into the memory 604. FIG. 6 shows an alternative embodiment of a control node 100 of a data communications system, for detecting anomalies in a computer application running on a device in the data communications system thereby creating events in the computer application, wherein each event comprises an event code identifying the event. The control node 100 comprises an obtaining module 704 for obtaining an event profile of the computer application, the event profile comprising each unique event code of events detected during a defined period of operation of the computer application. The control node 100 further comprises a detecting module 706 for detecting a first event from the computer application. The control node 100 further comprises a comparing module 708 for comparing the event code of the first event with the event codes of the event profile. The control node 100 further comprises a notification module 710 for creating a notification, when the first event does not match any event in the stored event profile. The control node 100 may further comprise a communication unit 602 similar to the communication unit of FIG. 5. In some embodiments, the modules 704, 706, 708, 710, 602 are implemented as a computer program running on processing circuitry such as a processor.

Although the description above contains a plurality of specificities, these should not be construed as limiting the scope of the concept described herein but as merely providing illustrations of some exemplifying embodiments of the described concept. It will be appreciated that the scope of the presently described concept fully encompasses other embodiments which may become obvious to those skilled in the art, and that the scope of the presently described concept is accordingly not to be limited. Reference to an element in the singular is not intended to mean "one and only one" unless explicitly so stated, but rather "one or more." All structural and functional equivalents to the elements of the above-described embodiments that are known to those of ordinary skill in the art are expressly incorporated herein by reference and are intended to be encompassed hereby. Moreover, it is not necessary for an apparatus or method to address each and every problem sought to be solved by the presently described concept, for it to be encompassed hereby. In the example figures, a broken line generally signifies that the feature within the broken line is optional.

The invention claimed is:

1. A method for detecting anomalies in a computer application running on a device in a data communications system thereby creating events in the computer application, each event comprising an event code identifying the event, the method comprising:

obtaining an event profile of the computer application, the event profile comprising each unique event code of events detected during a defined period of operation of the computer application, and additional information which is detailed information regarding the event which is not present in the corresponding event code—wherein the event profile is obtained by executing and recording all pre-defined test cases or no new event has been detected for a predefined amount of time, wherein obtaining an event profile comprises:

detecting a set of events from the computer application over a defined time period; and creating and storing an event profile of the computer application, comprising each unique event code of the detected set of events;

detecting a first event from the computer application;

comparing the event code of the first event with the event codes of the event profile;

if the first event does not match any event in the stored event profile, creating a notification regarding an anomalous event; and analyzing the anomalous event to determine whether it constitutes a true anomaly or not.

2. The method according to claim 1, wherein each event comprises order information comprising information regarding at least one preceding or following event.

3. The method according to claim 1, wherein creating and storing an event profile comprises the following steps for each event in the set of events:

comparing the event code of the event with the event codes of events already stored in the event profile; and if the event code of the event does not match any event code in the event profile, storing the event code of the event in the event profile.

4. The method according to claim 1 wherein obtaining an event profile further comprises:

obtaining information regarding which events that are considered delimiter events, wherein a delimiter event is an event indicating an end of an event pattern;

dividing the detected first set of events into event patterns, based on which events are indicated as delimiter events; and obtaining order information for each event, wherein the order information comprises information regarding at least one preceding or following event.

5. The method according to claim 2, wherein the comparing step is further based on the order information of the events.

6. The method according to claim 1, further comprising updating the computer application based on the notification.

7. The method according to claim 1, wherein the events further comprise timestamp information, and wherein the comparison step is further based on the timestamp information.

8. A control node operable in a data communications system, the data communications system further comprising a device a computer application may be run, wherein events are created in the computer application when run, and wherein each event comprises an event code identifying the event, the control node comprising:

processing circuitry; and a memory, said memory containing instructions executable by said processing circuitry, whereby said control node is operative for:

obtaining an event profile of the computer application, the event profile comprising each unique event code of events detected during a defined period of operation of the computer application, and additional information which is detailed information regarding the event which is not present in the corresponding event code, wherein the event profile is obtained by executing and recording all pre-defined test cases or no new event has been detected for a predefined amount of time, wherein obtaining an event profile comprises:

detecting a set of events from the computer application over a defined time period; and creating and storing an event profile of the computer application, comprising each unique event code of the detected set of events;

detecting a first event from the computer application;

comparing the event code of the first event with the event codes of the event profile; and when the first event does not match any event in the stored event profile, creating a notification regarding an anomalous event; and analyzing the anomalous event to determine whether it constitutes a true anomaly or not.

9. A computer program comprising non-transitory computer readable code means to be run in a control node of a data communications system, the data communications system further comprising a device a computer application is running, wherein events are created in the computer application, and wherein each event comprises an event code identifying the event, which computer readable code means when run in the control node causes the control node to perform the following steps:

obtaining an event profile of the computer application, the event profile comprising each unique event code of events detected during a defined period of operation of the computer application, and additional information which is detailed information regarding the event which is not present in the corresponding event code, wherein the event profile is obtained by executing and recording all pre-defined test cases or no new event has been detected for a predefined amount of time, wherein obtaining an event profile comprises:

detecting a set of events from the computer application over a defined time period; and creating and storing an event profile of the computer application, comprising each unique event code of the detected set of events;

detecting a first event from the computer application;

comparing the event code of the first event with the event codes of the event profile;

when the first event does not match any event in the stored event profile, creating a notification regarding an anomalous event; and analyzing the anomalous event to determine whether it constitutes a true anomaly or not.

10. A computer-readable medium storing instructions that, when executed by a control node of a data communications system, wherein the data communications system comprises a device a computer application is running, wherein events are created in the computer application, and wherein each event comprises an event code identifying the event, cause it to perform the step of:

obtaining an event profile of the computer application, the event profile comprising each unique event code of events detected during a defined period of operation of the computer application, and additional information which is detailed information regarding the event which is not present in the corresponding event code, wherein the event profile is obtained by executing and recording all pre-defined test cases or no new event has been detected for a predefined amount of time, wherein obtaining an event profile comprises:

detecting a set of events from the computer application over a defined time period; and creating and storing an event profile of the computer application, comprising each unique event code of the detected set of events;

detecting a first event from the computer application;

comparing the event code of the first event with the event codes of the event profile;

if the first event does not match any event in the stored event profile, creating a notification regarding an anomalous event; and analyzing the anomalous event to determine whether it constitutes a true anomaly or not.

* * * * *